United States Patent [19]

Wu

[11] Patent Number: 5,101,721
[45] Date of Patent: Apr. 7, 1992

[54] BRANDING DEVICE FOR CATTLE

[76] Inventor: Duen S. Wu, P.O. Box 82-144, Taipei, Taiwan

[21] Appl. No.: 737,663

[22] Filed: Jul. 30, 1991

[51] Int. Cl.⁵ .......................... B44B 5/02; B44B 7/02
[52] U.S. Cl. ...................................... 101/31; 101/368
[58] Field of Search .................... 101/31, 41, 42, 35, 101/368, 372, 373; 219/228; 126/402-404

[56] References Cited

U.S. PATENT DOCUMENTS

| | | | |
|---|---|---|---|
| 1,064,455 | 10/1913 | Dodge | 101/372 |
| 1,237,983 | 8/1917 | Werner | 101/41 |
| 2,159,697 | 5/1939 | Hardy | 101/368 |
| 4,172,419 | 10/1979 | Munyon | 101/368 |
| 4,375,191 | 3/1983 | Dickey | 101/368 |

Primary Examiner—David A. Wiecking
Assistant Examiner—Anthony H. Nguyen
Attorney, Agent, or Firm—Alfred Lei

[57] ABSTRACT

This invention relates to a branding device for cattle and in particular to one including a rectangular frame divided into a plurality of chambers formed on an upper edge with two lugs, a spring mounted on the two lugs of each chamber, two belts connected with the rectangular frame and moulds adapted to be received in the chamber of the rectangular frame, thereby making it easier, quicker and safer to brand cattle.

1 Claim, 4 Drawing Sheets

BRANDING DEVICE FOR CATTLE

BACKGROUND OF THE INVENTION

Conventionally, cattle are simply marked by the following two methods: attaching a label with numerals on a cattle, or branding a cattle with letter and/or numeral moulds which is shown in FIG. 1. As illustrated, when in use, a letter or numeral mould 12 is first immersed into a pail 22 of liquid nitrogen for cooling, and then taken out to press on the cattle's body thereby marking the cattle. However, such method still has the following drawbacks:

1. At least three to four persons are required to brand the cattle when the code has five digits;
2. It is time-consuming to brand the cattle;
3. It is difficult to brand the code on the cattle clearly.

Therefore, it is an object of the present invention to provide a branding device for cattle which may obviate and mitigate the above-mentioned drawbacks.

SUMMARY OF THE INVENTION

This invention relates to an improved branding device for cattle.

It is the primary object of the present invention to provide a branding device for cattle which may brand the cattle in a short time.

It is another object of the present invention to provide a branding device for cattle which is simple in construction.

It is still another object of the present invention to provide a branding device for cattle which is safe in use.

It is still another object of the present invention to provide a branding device for cattle which is economic to produce.

It is a further object of the present invention to provide a branding device for cattle which is easy to operate.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
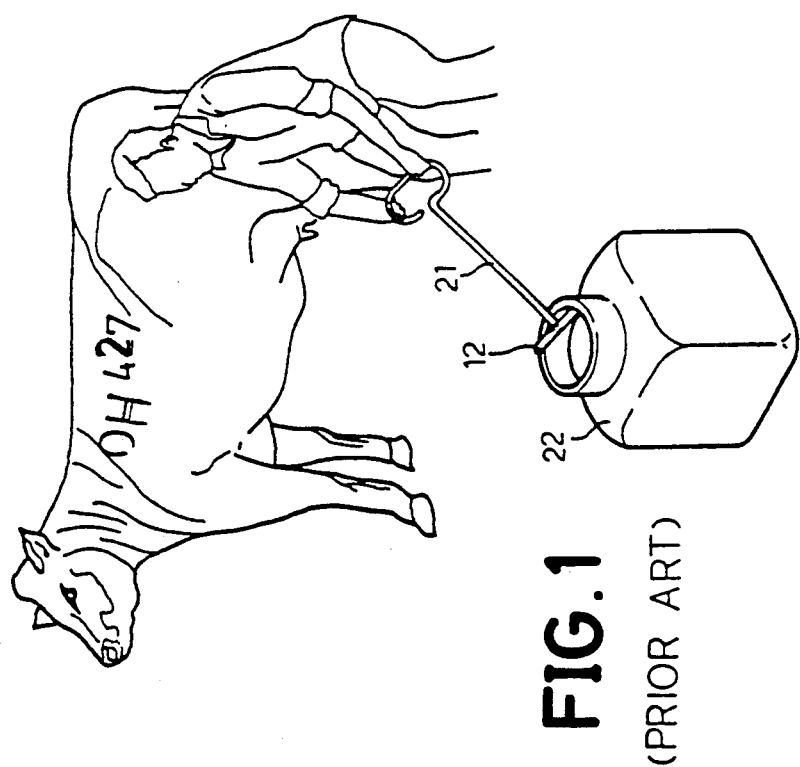
FIG. 1 is a perspective view showing the way to brand a cow with the prior art branding device.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
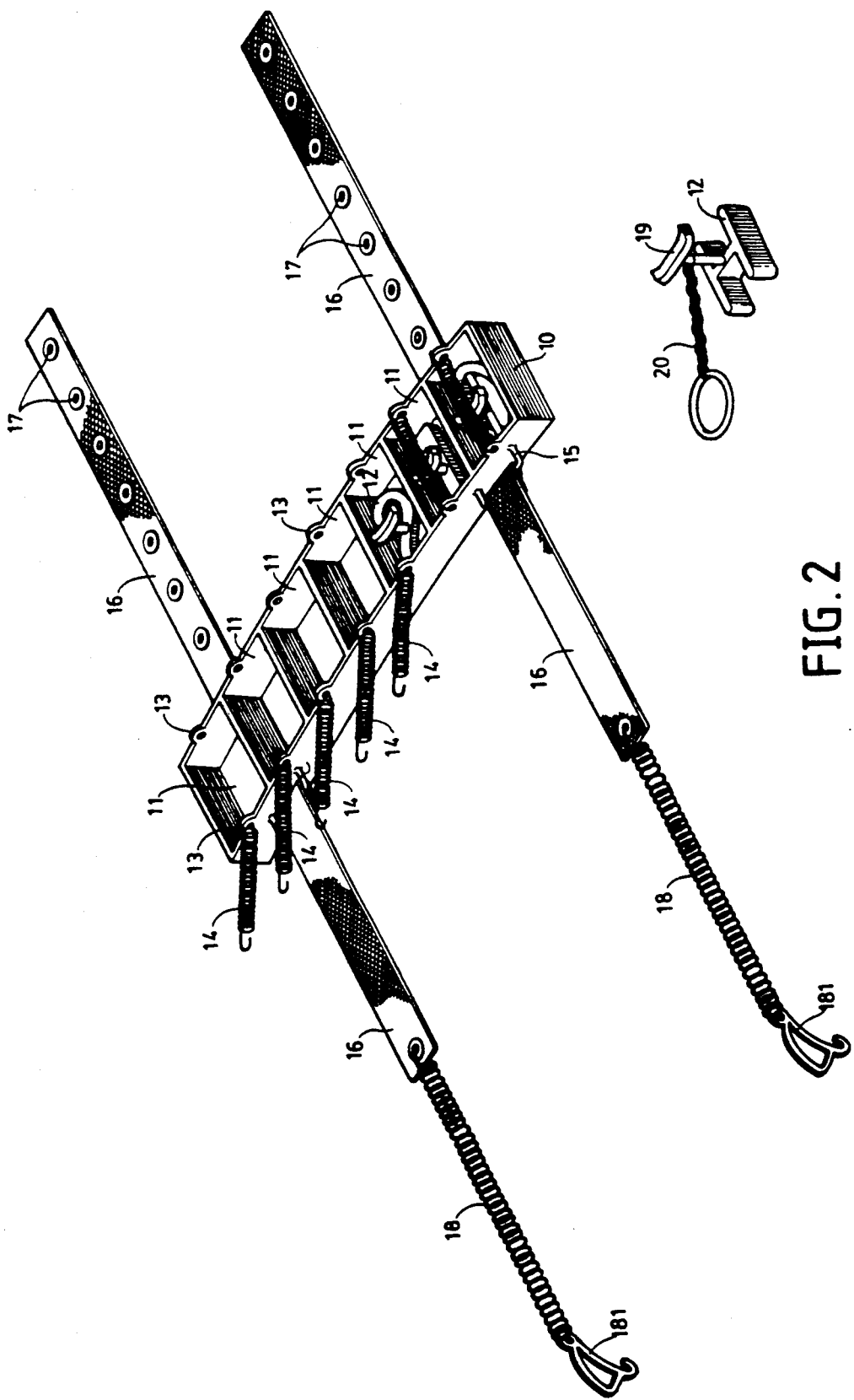
FIG. 2 is a perspective view showing the structure of a branding device for cattle according to the present invention.
Figure 3:
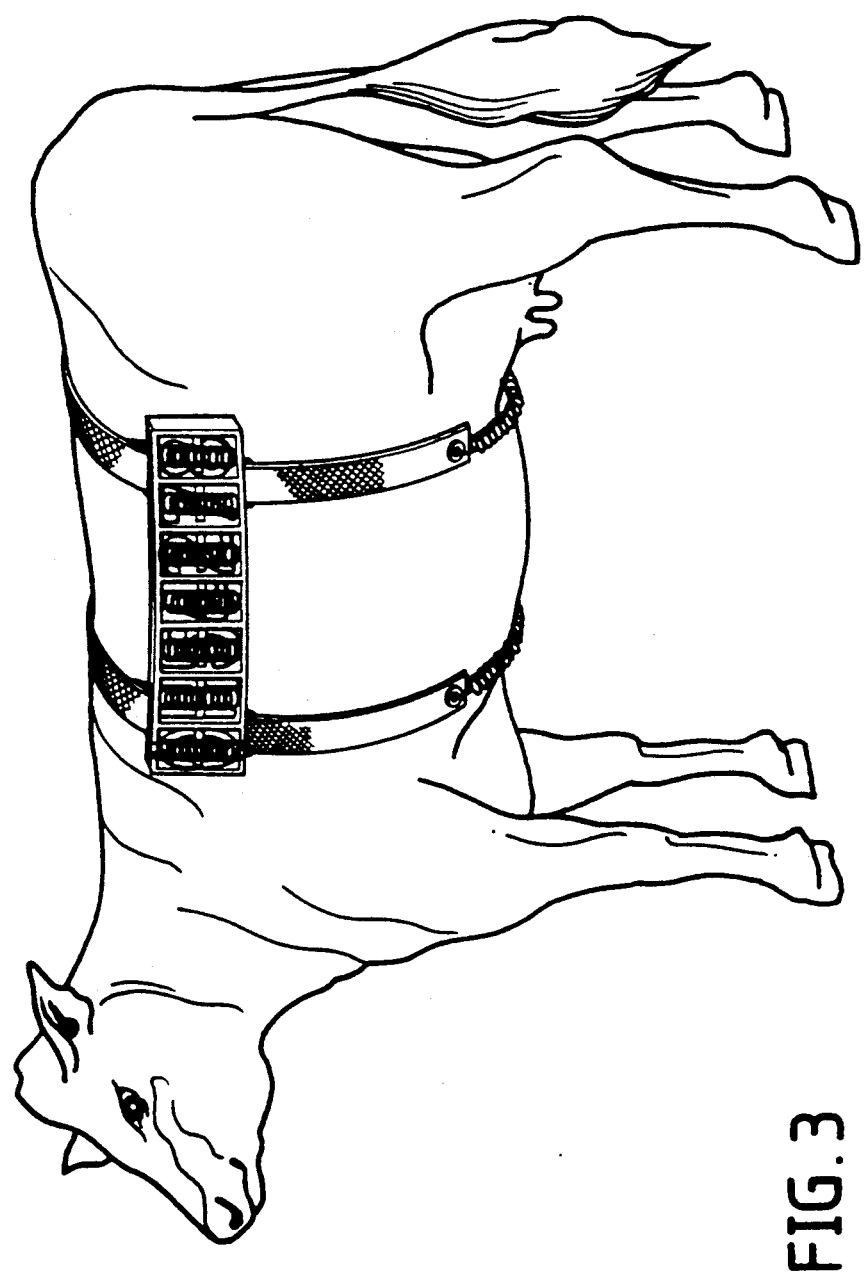
FIG. 3 is a working view of the present invention.
Figure 4:
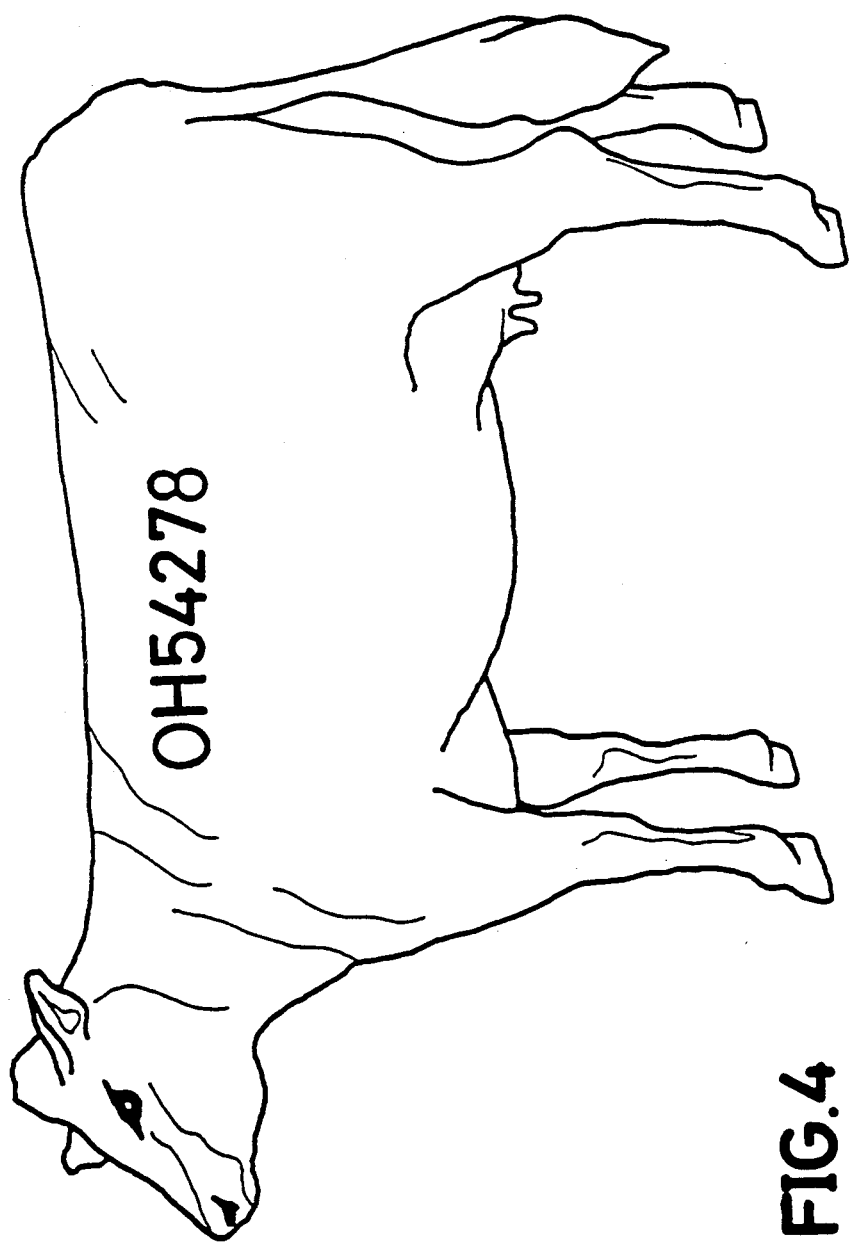
FIG. 4 shows a cow branded with the present invention.

With reference to the drawings and in particular to FIG. 2 thereof, the branding device according to the present invention comprises a rectangular frame 10 divided into a plurality of chambers 11 for receiving a letter or numeral mould 12. Each chamber 11 is formed on the upper edge with two lugs 13 for engaging with a spring 14 so as to keep the mould 12 in position. The rectangular frame 10 has two ears 15 on both sides for connecting with four belts 16. Two of the belts are provided with a plurality of punch holes 17 while the others are connected with a spring 18 having a hook 181 at the end. The belts 16 are used to tie the frame 10 on the cattle so that the frame 10 may be rotated around the body of the cattle so as to be fixed at an appropriate position such as a portion with black hair. The mould 12 is casted in copper and has a handle 19 thereon and a chain 20 connected with the handle 19.

It should be noted that the number of chambers 11 in the frame 10 may be formed as required.

In use, first take out required moulds 12 from liquid nitrogen by holding the handle 19 with leather glove and then fit it into the corresponding chambers 11 thereby branding a code on the cattle.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A branding device comprising:
   a rectangular frame divided into a plurality of chambers formed on an upper edge with two lugs;
   a spring mounted on the two lugs of each said chamber;
   two belts connected with said rectangular frame; and
   moulds adapted to be received in the chamber of said rectangular frame, said moulds having a handle and a chain connected with the handle.

* * * * *